(12) United States Patent
Cannon et al.

(10) Patent No.: US 6,411,437 B1
(45) Date of Patent: Jun. 25, 2002

(54) INTEGRATING POLARIZATION CONVERSION SYSTEM

(75) Inventors: Bruce L. Cannon; Arlie R. Conner, both of Portland, OR (US)

(73) Assignee: Corning Precision Lens, Incorporated, Corning, NY (US)

( * ) Notice: Subject to any disclaimer, the term of this patent is extended or adjusted under 35 U.S.C. 154(b) by 0 days.

(21) Appl. No.: 09/607,506

(22) Filed: Jun. 28, 2000

(51) Int. Cl.[7] .......................... G02B 5/30; G02B 27/28; G03B 21/00
(52) U.S. Cl. .................... 359/487; 359/495; 359/497; 359/622; 359/627; 359/629; 353/20; 353/33; 362/19
(58) Field of Search ................................. 359/487, 495, 359/496, 497, 622, 627, 629; 353/20, 33; 362/19; 349/9

(56) References Cited

U.S. PATENT DOCUMENTS

| | | | | |
|---|---|---|---|---|
| 2,748,659 A | * | 6/1956 | Geffcken et al. | |
| 3,743,380 A | * | 7/1973 | Fugitt | |
| 5,283,600 A | * | 2/1994 | Imai | 353/33 |
| 5,381,278 A | * | 1/1995 | Shingaki et al. | 350/20 |
| 5,555,186 A | * | 9/1996 | Shioya | 359/639 |
| 5,566,367 A | * | 10/1996 | Mitsutake et al. | 359/495 |
| 5,653,520 A | * | 8/1997 | Kato | 353/33 |
| 5,729,306 A | * | 3/1998 | Miyake et al. | 349/9 |
| 5,764,412 A | * | 6/1998 | Suzuki et al. | 359/487 |
| 5,967,635 A | | 10/1999 | Tani et al. | 353/20 |
| 5,978,136 A | | 11/1999 | Ogawa et al. | 359/487 |
| 5,986,809 A | | 11/1999 | Itoh et al. | 359/618 |
| 6,084,714 A | * | 7/2000 | Ushiyama et al. | 359/627 |
| 6,101,040 A | * | 8/2000 | Itoh | 359/622 |
| 6,144,492 A | * | 11/2000 | Iwamura et al. | 359/487 |
| 6,147,802 A | * | 11/2000 | Itoh et al. | 359/495 |

* cited by examiner

*Primary Examiner*—Ricky D. Shafer
(74) *Attorney, Agent, or Firm*—Ipsolon LLP

(57) ABSTRACT

A polarization conversion system provides generally uniform polarized illumination light while maximizing illumination brightness by utilizing all illumination light, particularly the typically brightest illumination light available in a central region. In one implementation, the polarization conversion system includes a pair of lens arrays that successively receive light from an illumination source. A planar array of polarization beamsplitters is positioned adjacent the latter lens array. Each polarization beamsplitter includes a pair of elongated right-angle prisms having their respective inclined faces positioned against each other and their lengths extending vertically across multiple lenslets of the latter lens array. The polarization beamsplitter array includes coplanar top and bottom array segments, the inclined faces of the prisms of the polarization beamsplitters of the top array segment being oriented at substantially one angle (e.g., +45°) and the inclined faces of the prisms of the polarization beamsplitters of the bottom array segment being oriented at substantially a reversed angle (e.g., −45°). The top and bottom polarization beamsplitter array segments meet each other end-to-end with substantially no space between them. As a result, the polarization conversion system of the present invention provides generally uniform polarized illumination light while maximizing illumination brightness.

20 Claims, 4 Drawing Sheets

INTEGRATING POLARIZATION CONVERSION SYSTEM

FIELD OF THE INVENTION

The present invention relates to polarization conversion systems and, in particular, to an integrating polarization conversion system that maximizes illumination brightness.

BACKGROUND AND SUMMARY OF THE INVENTION

Various display devices, including electronic projectors (e.g., liquid crystal display projectors), employ illumination sources to illuminate the display device. An important performance requirement of such display devices is that the illumination light be uniform over the entire area of the display device. Variations in illumination uniformity are readily discernible and are an undesirable artifact. In addition, some display devices, including many that employ liquid crystal cells to impart image information, require that the illumination light be polarized for the display device to be operable.

U.S. Pat. No. 5,978,136 describes a polarization illumination device directed to providing polarized illumination light with improved illumination uniformity. This polarization illumination device includes a pair of lens arrays and an optical element containing two polarization beamsplitter arrays for converting polarized light with random polarization directions to one type of polarized light. Each polarization beamsplitter array includes multiple polarization beamsplitters with inclined surfaces that are parallel with each other.

The inclined surfaces of the two polarization beamsplitter arrays face each other generally to form a chevron configuration. To accommodate the center of the chevron, the two polarization beamsplitter arrays are spaced apart from each other to form a central stripe region. Due to the absence of a polarization beamsplitter, illumination light in the central stripe region is not polarized and, as a consequence, is not utilized for display illumination.

In accordance with the present invention, a polarization conversion system provides generally uniform polarized illumination light while maximizing illumination brightness by utilizing all illumination light, including the typically brightest illumination light available along a central region. In one implementation, the polarization conversion system includes a pair of lens arrays that successively receive light from an illumination source. Each lens array has multiple lenslets, and corresponding lenslets in the two arrays are optically aligned with each other.

A planar array of polarization beamsplitters is positioned adjacent the latter lens array. Each polarization beamsplitter includes a pair of elongated right-angle prisms having their respective inclined faces positioned against each other and their lengths extending vertically across multiple lenslets of the latter lens array. The polarization beamsplitter array includes coplanar top and bottom array segments, the inclined faces of the prisms of the polarization beamsplitters of the top array segment being oriented at substantially one angle (e.g., +45°) and the inclined faces of the prisms of the polarization beamsplitters of the bottom array segment being oriented at substantially a reversed angle (e.g., −45°). The top and bottom polarization beamsplitter array segments meet each other end-to-end with substantially no space between them. As a result, the polarization conversion system of the present invention provides generally uniform polarized illumination light while maximizing illumination brightness.

As another implementation the present invention, each of the lens arrays includes coplanar top and bottom lens array segments that each include plural lenslets. The lenslets of the top and bottom lens array segments are aligned with the polarization beamsplitter arrays in the top and bottom polarization beamsplitter array segments. In addition, the lenslets and polarization beamsplitters of the top segments are laterally offset relative to the lenslets and polarization beamsplitters of the bottom segments. This lateral offset provides increased uniformity of illumination and alleviates shadowing due to the x-cube centerline discontinuity. The horizontal frequency content of the angular distribution of the illumination is increased, basically doubled, with reduced amplitude, and further approximates the smooth 'Gaussian' distribution that is expected by the optical system, the projection lens and the human eye. In contrast, a conventional illumination system provides hot pencils of rays that cause discontinuous artifacts, sharp-edged shadows, etc.

Additional objects and advantages of the present invention will be apparent from the detailed description of the preferred embodiment thereof, which proceeds with reference to the accompanying drawings.

DETAILED DESCRIPTION OF PREFERRED EMBODIMENTS

Figure 1:
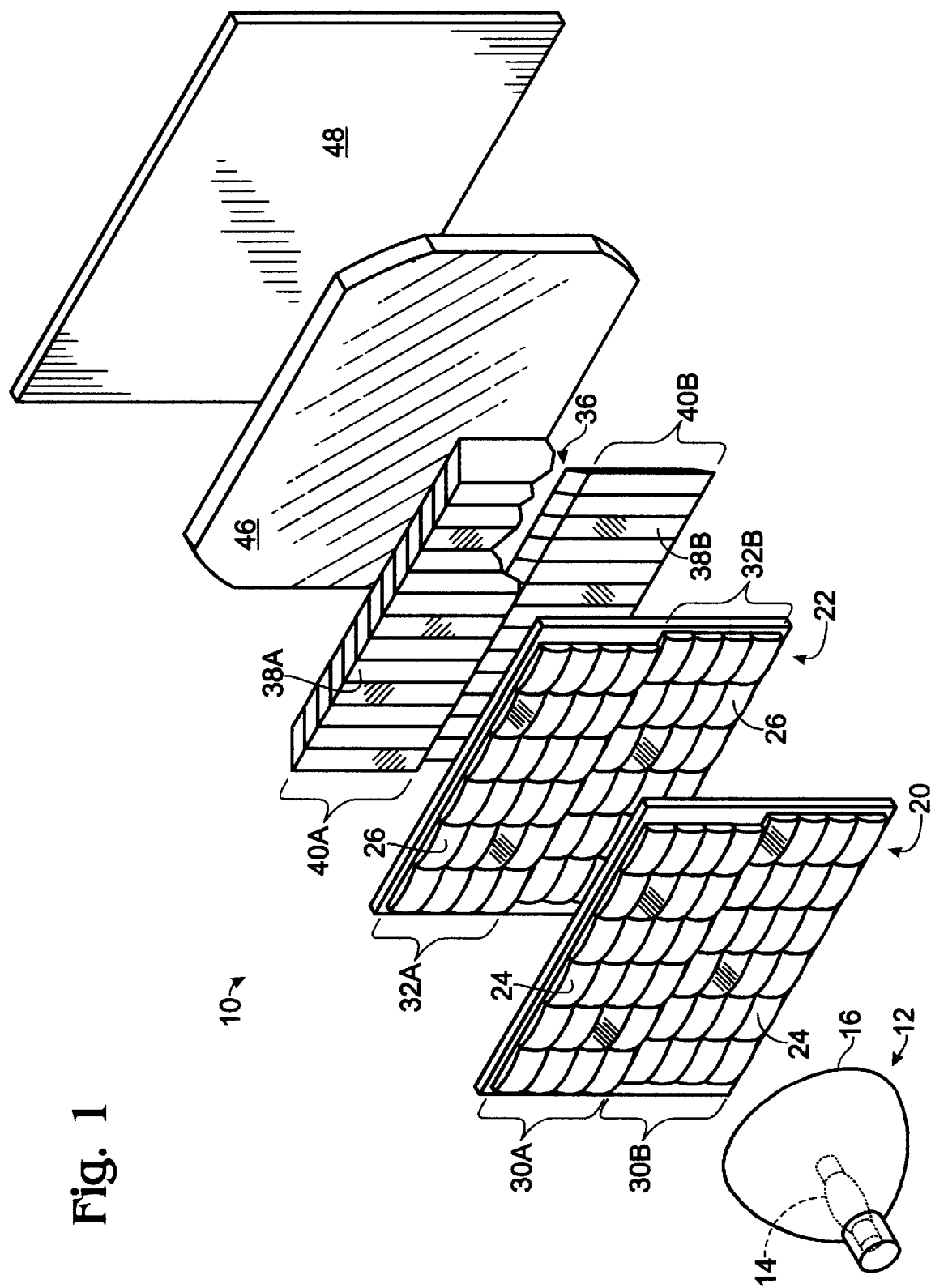
FIG. 1 is an exploded isometric view of one implementation of a polarization conversion system of the present invention.

FIG. 1 is an exploded isometric view of one implementation of a polarization conversion system 10 of the present invention positioned to receive light from an illumination source 12 having a lamp 14 and a reflector (e.g., parabolic) 16. Illumination source 12 provides light with random polarization directions that include an S-polarized component and a P-polarized component. Polarization conversion system 10 integrates or combines (i.e., superimposes) different portions of the illumination light to increase uniformity and converts the light from illumination source 12 to one polarization type (e.g., P-polarized light).

Polarization conversion system 10 includes a pair of integrator lens arrays 20 and 22 (sometimes called fly's eyes) that include multiple lenslets 24 and 26, respectively, and successively receive light from illumination source 12. Each of lenslets 24 of lens array 20 is optically aligned with a lenslet 26 of lens array 22. Lens array 20 includes coplanar top and bottom array segments 30A and 30B that are laterally (i.e., horizontally) offset from each other. Similarly, lens array 22 includes coplanar top and bottom array segments 32A and 32B that are laterally offset from each other. As illustrated, array segments 30A and 30B are immediately adjacent each other with substantially no separation between them, and array segments 32A and 32B are immediately adjacent each other with substantially no separation between them.

Figure 2:
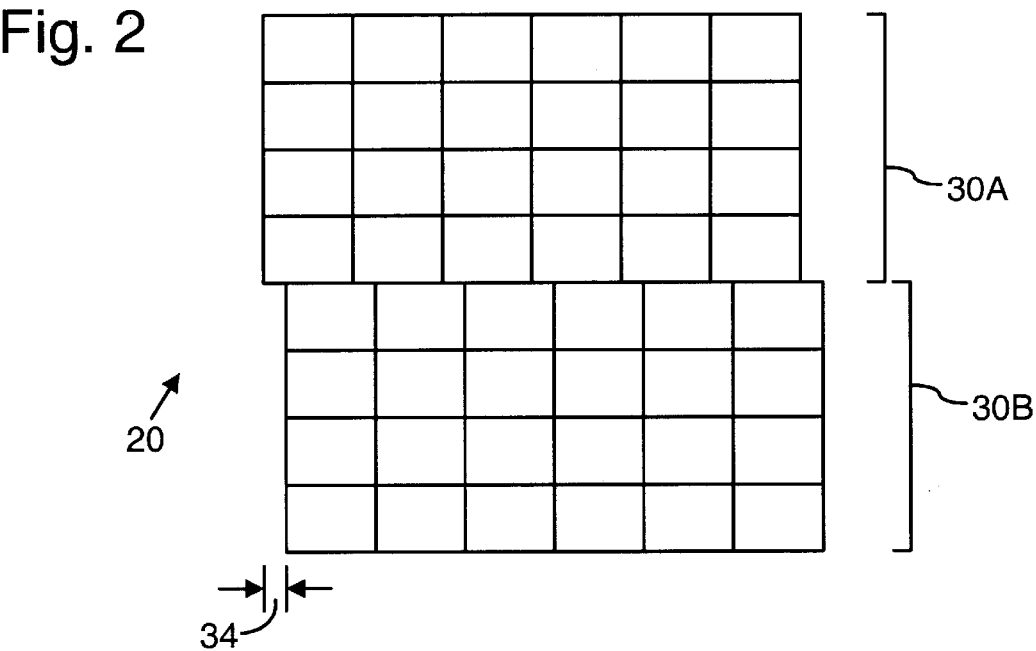
FIG. 2 is a front view of an exemplary implementation of lens array showing top and bottom lens array segments and a lateral offset between them.

FIG. 2 is a front view of an exemplary implementation of lens array 20 showing lens array segments 30A and 30B and a lateral offset 34 between them. In its illustrated implementation, polarization conversion system 10 employs lens arrays 20 and 22 that are substantially identical. As a result, polarization conversion system 10 with lens array 20 of FIG. 2 would include a substantially identical lens array 22. Generally, lens arrays 20 and 22 include matched arrays of lenslets, but lens arrays 20 and 22 can be of different sizes to shrink or expand the resulting illumination image with a non-unitary magnification.

Figure 3:
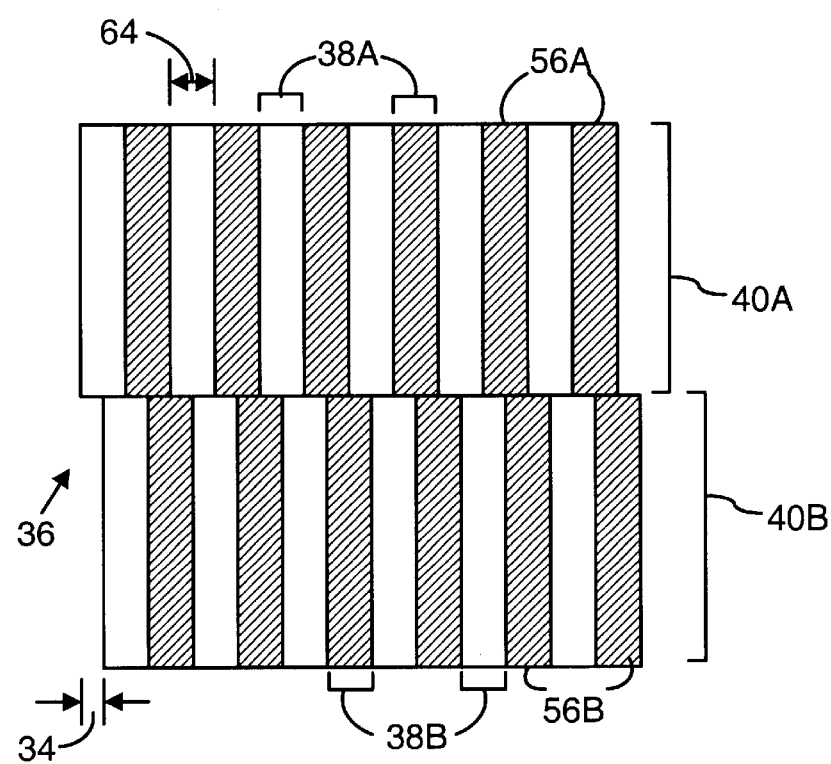
FIG. 3 is a rear view of a planar polarization beamsplitter array showing top and bottom array segments and a lateral offset between them.
Figure 4:
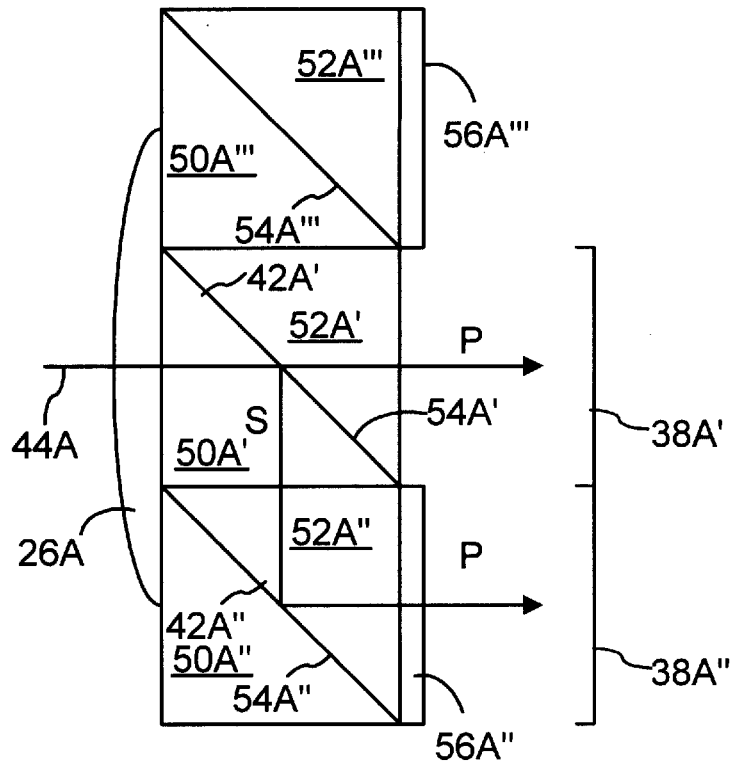
FIG. 4 is a diagrammatic sectional view of a polarization beamsplitter of a bottom polarization beamsplitter array segment.
Figure 5:
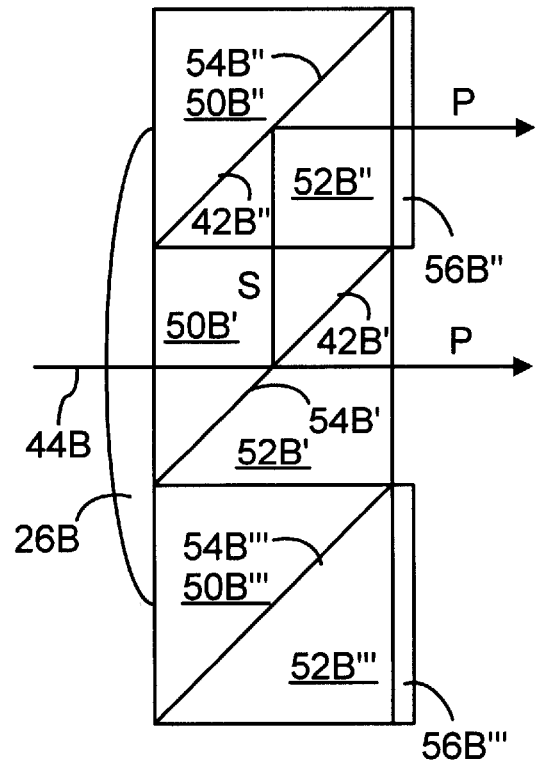
FIG. 5 is a diagrammatic sectional view of a polarization beamsplitter of a top polarization beamsplitter array segment.

With reference to FIGS. 3–5, aligned lenslets 24 and 26 of respective lens arrays 20 and 22 cooperate to focus light from illumination source 12 through a planar array 36 of polarization beamsplitters 38A, 38B. In FIGS. 4 and 5, reference numerals include one or more hash-marks to indicate the components of a particular polarization beamsplitter 38A', for example. When referred to generally, the components and polarization beamsplitters are referred to by their common reference numerals without the hash marks (e.g. 38A). Polarization beamsplitter array 36 includes coplanar top and bottom array segments 40A and 40B. As described below in greater detail, polarization beamsplitters 38A (FIG. 4) of top polarization beamsplitter array segment 40A includes internal inclined faces 42A that are oriented at one angle (e.g., +45°) to an optical axis direction 44A, and polarization beamsplitters 38B of bottom polarization beamsplitters array segment 40B includes internal inclined faces 42B that are oriented at a reversed angle (e.g., complementary, −45°) to optical axis direction 44B. Polarization beamsplitter array segments 40A and 40B are immediately adjacent each other. Polarization beamsplitter array 36 receives light of arbitrary polarization and passes polarized light (e.g., P-polarized) to a condenser lens 46 (FIG. 1) that superimposes and directs the polarized light onto an illumination target 48 (FIG. 1), such as a flat panel (e.g., liquid crystal) display.

Lenslets 24 and 26 cooperate to integrate light from illumination source 12 to provide increased illumination uniformity for illumination target 48, such as a flat panel (e.g., liquid crystal) display. In applications such as electronic (e.g., liquid crystal display) projectors, illumination uniformity directly corresponds to display uniformity, which is an important display quality characteristic. Lenslets 24 and 26 provide light integration because each lenslet 24 captures a fraction of the solid arc of light provided by illumination source 12 and directs that fraction to the corresponding lenslet 26. All the fractions of the solid arc of light provided by illumination source 12 captured by lenslet pairs 24 and 26 are directed in their entireties to illuminate the full illumination target 48, such as a flat panel (e.g., liquid crystal) display.

FIG. 4 is a diagrammatic sectional view of adjacent polarization beamsplitters 38A of top polarization beamsplitter array segment 40A and adjacent lenslets 26 of lens array 22. The following description of the operation of a polarization beamsplitter 38A is similarly applicable to polarization beamsplitters 38B of bottom polarization beamsplitter array segment 40B shown in FIG. 5, with like elements having the same reference numeral but different alphabetic suffixes (e.g., inclined faces 42A and 42B and half-wave retarders 56A and 56B).

For purposes of illustration, exemplary polarization beamsplitter 38A' includes a pair of right-angle prisms 50A' and 52A' having their respective inclined faces 42A" positioned against each other with a dielectric film 54A' therebetween. In one implementation, adjacent prisms (e.g., 50A'/52A" and 52A'/50A'") of adjacent polarization beamsplitters are formed as integral or unitary components having a cross-sectional parallelogram shape. One way of manufacturing polarization beamsplitter arrays in such a manner is described in U.S. Pat. No. 5,978,136.

Dielectric film 54A' is polarization selective and generally achromatic. Accordingly, one of S- and P-polarized light is transmitted through dielectric film 54A' (e.g., P-polarized light), and the other of the S- and P-polarized light (e.g., S-polarized light) is reflected to a dielectric film 54A" on an adjacent inclined face 42A" to be reflected outward through a half-wave retarder 56A". Half-wave retarder 56A" converts the reflected S-polarized light to P-polarized light, so that all light passing from polarization beamsplitter 38A' is of a single polarization (e.g., P-polarization).

Polarization beamsplitters 38A and 38B are elongated in a vertical direction (i.e., vertically aligned) to extend across multiple lenslets 26 while having a horizontal width that is no greater than (e.g., one-half) that of a lenslet 26. In practice, lenslets 26 may be designed according to the horizontal widths of polarization beamsplitters 38. Polarization beamsplitters 38B meet polarization beamsplitters 38A end-to-end with substantially no separation between them except, for example, for an incidental separation arising from an adhesive for bonding polarization beamsplitters 38A and 38B together.

Dielectric films 54 of polarization beamsplitters 38 receive ilumination light over a relatively wide range of input angles, and the light is passed over a relatively wide range of output angles to illumination target 48, much as a flat panel (e.g., liquid crystal) display. Despite the generally achromatic nature of dielectric films 54, such wide illumination angles can result in a color shift from one side to the other of illumination target 48, with one side being tinted blue and the other side being tinted red, for example.

To compensate for such color shifting and to alleviate the chromatic image artifacts that would otherwise arise, such as in a projection flat panel (e.g., liquid crystal) display, polarization beamsplitters 38A of top polarization beamsplitter array segment 40A include internal inclined faces 42A that are oriented at one angle (e.g., +45°) to an optical axis direction 44A, and polarization beamsplitters 38B of bottom polarization beamsplitter array segment 40B includes internal inclined faces 42B that are oriented at a complementary angle (e.g., −45°) to optical axis direction 44B.

The opposed orientations of inclined faces 42A and 42B of polarization beamsplitters 38A and 38B result in offsetting color shifts. For example, polarization beamsplitters 38A could produce a red-to-blue color shift that extends right-to-left, while polarization beamsplitters 38B could produce a red-to-blue color shift that extends left-to-right. With the superpositioning of illumination light over all of target 48 from each lenslet pair 24, 24, the offsetting color shifts of polarization beamsplitters 38A and 38B result in general chromatic uniformity over illumination target 48.

Figure 6:
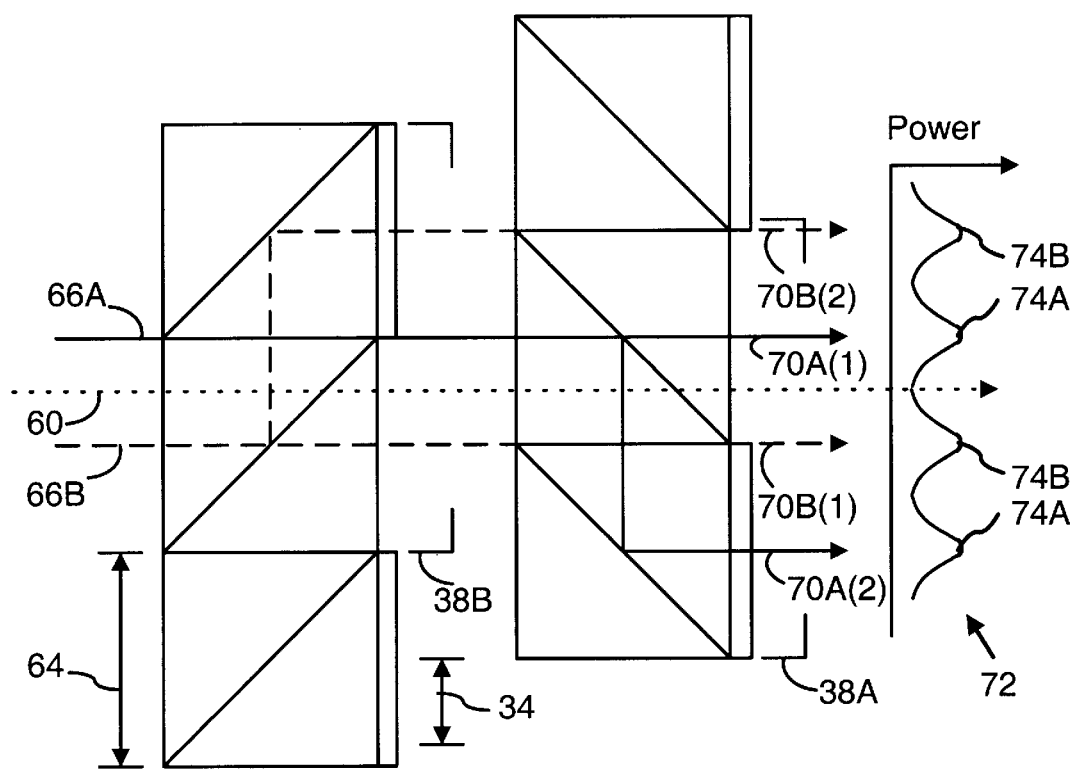
FIG. 6 is a diagrammatic illustration of exemplary polarization beamsplitters to illustrate a benefit of a lateral offset between segments of the polarization beamsplitters lens array lenslets.

FIG. 6 is a diagrammatic illustration of exemplary polarization beamsplitters 38A and 38B of respective top and bottom polarization beamsplitter array segments 40A and 40B and adjacent lenslets 26 of lens array 22. As described above, each of beamsplitters 38 receives a different portion of the illumination light provided by illumination source 12. In FIG. 6, polarization beamsplitters 38A and 38B are shown successively relative to an optical center line 60 to illustrate a benefit of the lateral offset between polarization beamsplitters 38A and 38B and between the corresponding top and bottom lens array segments.

Each of polarization beamsplitters 38A and 38B operates in the manner described above with reference to FIGS. 4 and 5. FIG. 6 illustrates the effect of lateral offset 34 between polarization beamsplitters 38A and 38B of, for example, about one-half the widths 64 of polarization beamsplitters 38. Exemplary input light ray 66A passes through polarization beamsplitter 38A as output light rays 70A(1) and 70A(2) that correspond to input light of P- and S-polarizations, respectively. Similarly, exemplary input light ray 66B passes through polarization beamsplitter 38B as output light rays 70B(1) and 70B(2) that correspond to input light of P- and S-polarizations, respectively.

Output light rays 70A(1), 70A(2), 70B(1), and 70B(2) correspond to an output power distribution 72 having multiple illumination power peaks 74A and 74B (referred to generally as illumination power peaks 74). Each pair of lenslets 24 and 26 of polarization conversion system 10 functions to provide an image of illumination source 12, and each illumination power peak 74 corresponds to an image of illumination source 12 (sometimes referred to as an apparent source).

For example, one implementation of polarization conversion system 10 could have six pairs of vertically aligned polarization beamsplitters 38A and six pairs of vertically aligned polarization beamsplitters 38B, with lens arrays 20 and 22 including multiple rows of six lenslets each. Each top row of lenslets in such an implementation would provide twelve horizontally oriented illumination power peaks 74A, and each bottom row of lenslets in such an implementation would provide twelve other horizontally oriented illumination power peaks 74B. With four top rows and four bottom rows of lenslets, for example, such an implementation would have an array of 96 illumination power peaks 74.

The implementation of polarization conversion system 10 described above includes a lateral offset 34 between top and bottom segments of lenslets and polarization beamsplitters. It will be appreciated that in an alternative implementation, a polarization conversion system of the present invention could be formed without such a lateral offset. Such an implementation would include elongated polarization beamsplitters that meet each other end-to-end to provide chromatically uniform illumination without omitting a central stripe of illumination, as described in U.S. Pat. No. 5,978,136. Preserving the central region of illumination is important in maximizing the illumination brightness provided by an illumination system, which is typically the critical performance requirement for an illumination system. Moreover, the implementation of polarization conversion system 10 described includes top and bottom segments of lenslets and polarization beamsplitters. It will be appreciated that in an alternative implementation, a polarization conversion system of the present invention could be formed with other orientations so that, for example, segments of lenslets and polarization beamsplitters of the present invention are positioned horizontally adjacent each other, rather than vertically adjacent each other as described hereinabove.

In view of the many possible embodiments to which the principles of our invention may be applied, it should be recognized that the detailed embodiments are illustrative only and should not be taken as limiting the scope of our invention. Rather, the invention includes all such embodiments as may come within the scope and spirit of the following claims and equivalents thereto.

What is claimed is:

1. A polarization conversion system, comprising:
   first and second lens arrays that each include multiple lenslets, each lenslet of the first lens array being optically aligned with a lenslet of the second lens array; and
   a planar array of polarization beamsplitters positioned adjacent the second lens array, each polarization beamsplitter including a pair of elongated prisms having respective inclined faces positioned against each other and their lengths extending vertically across plural lenslets of the second lens array, the polarization beamsplitter array including coplanar top and bottom array segments, the inclined faces of the prisms of the polarization beamsplitters of the top array segment being oriented at substantially a first angle and the inclined faces of the prisms of the polarization beamsplitters of the bottom array segment being oriented at substantially a second angle that is reversed relative to the first angle, the elongated prisms of the polarization beamsplitters of the top array segment meeting the elongated prisms of the polarization beamsplitters of the bottom array segment only at their ends with substantially no separation between them.

2. The system of claim 1 in which the planar array of polarization beamsplitters defines an array plane and the first and second angles of the inclined faces of the prisms of the polarization beamsplitters of the top and bottom array segments are each 45° relative to the array plane, but of opposite angular directions.

3. The system of claim 1 in which the lenslets of the first and second lens arrays are the same.

4. The system of claim 1 in which the optically aligned lenslets of the first and second lens arrays provide no image magnification.

5. The system of claim 1 in which the optically aligned lenslets of the first and second lens arrays provide non-unitary image magnification.

6. A polarization conversion system, comprising:
   first and second lens arrays that each include multiple lenslets, each lenslet of the first lens array being optically aligned with a lenslet of the second lens array; and
   a planar array of polarization beamsplitters positioned adjacent the second lens array, each polarization beamsplitter including a pair of elongated prisms having respective inclined faces positioned against each other and their lengths extending vertically across plural lenslets of the second lens array, the polarization beamsplitter array including coplanar top and bottom array segments, the inclined faces of the prisms of the polarization beamsplitters of the top array segment being oriented at substantially a first angle and the inclined faces of the prisms of the polarization beamsplitters of the bottom array segment being oriented at substantially a second angle that is reversed relative to the first angle,
   each of the first and second lens arrays having coplanar top and bottom lens array segments that each include plural lenslets, the lenslets of the top and bottom lens array segments being aligned with the polarization beamsplitter arrays in the top and bottom array segments, the lenslets and polarization beamsplitters of the top segments being offset by a lateral offset relative to the lenslets and polarization beamsplitters of the bottom segments.

7. The system of claim 6 in which the polarization beamsplitters have a horizontal width and the lateral offset between the top and bottom segments is about one-half the horizontal width of the polarization beamsplitters.

8. A polarization conversion system, comprising:

first and second lens arrays that each include multiple lenslets, each lenslet of the first lens array being optically aligned with a lenslet of the second lens array; and a planar array of polarization beamsplitters positioned adjacent the second lens array, each polarization beamsplitter including a pair of elongated prisms having their respective inclined faces positioned against each other and their lengths extending across plural lenslets of the second lens array, the polarization beamsplitter array including coplanar first and second array segments, the inclined faces of the prisms of the polarization beamsplitters of the first array segment being oriented at substantially a first angle and the inclined faces of the prisms of the polarization beamsplitters of the second array segment being oriented at substantially a second angle that is reversed relative to the first angle, the elongated prisms of the polarization beamsplitters of the first array meeting the elongated prisms of the polarization beamsplitters of the second array at only one end each.

9. The system of claim 8 in which the planar array of polarization beamsplitters defines an array plane and the first and second angles of the inclined faces of the prisms of the polarization beamsplitters of the first and second array segments are each 45° relative to the array plane, but of opposite angular directions.

10. The system of claim 8 in which the lenslets of the first and second lens arrays are the same.

11. The system of claim 8 in which the optically aligned lenslets of the first and second lens arrays provide no image magnification.

12. The system of claim 8 in which the optically aligned lenslets of the first and second lens arrays provide non-unitary image magnification.

13. The system of claim 8 in which each of the first and second lens arrays includes coplanar first and second lens array segments that each include plural lenslets, the lenslets of the first and second lens array segments being aligned with the polarization beamsplitter arrays in the respective first and second array segments, the lenslets and polarization beamsplitters of the first segments being offset relative to the lenslets and polarization beamsplitters of the second segments.

14. The system of claim 13 in which the offsets are transverse to the lengths of the polarization beamsplitters and in the planes of the lens and polarizing beamsplitter arrays.

15. A polarization conversion system, comprising:

first and second lens arrays that each include multiple lenslets, each lenslet of the first lens array being optically aligned with a lenslet of the second lens array; and a planar array of polarization beamsplitters positioned adjacent the second lens array, each polarization beamsplitter including a pair of elongated prisms having their respective inclined faces positioned against each other and their lengths extending across plural lenslets of the second lens array, the polarization beamsplitter array including coplanar first and second array segments, the inclined faces of the prisms of the polarization beamsplitters of the first array segment being oriented at substantially a first angle and the inclined faces of the prisms of the polarization beamsplitters of the second array segment being oriented at substantially a second angle that is reversed relative to the first angle, the polarization beamsplitters of the first and second arrays meeting each other end-to-end with substantially no space between them, each of the first and second lens arrays having coplanar first and second lens array segments that each include plural lenslets, the lenslets of the first and second lens array segments being aligned with the polarization beamsplitter arrays in the respective first and second array segments, the lenslets and polarization beamsplitters of the first segments being offset relative to the lenslets and polarization beamsplitters of the second segments.

16. The system of claim 15 in which the offsets are transverse to the lengths of the polarization beamsplitters and in the planes of the lens and polarizing beamsplitter arrays.

17. The system of claim 15 in which the offsets are horizontal and in the planes of the lens and polarizing beamsplitter arrays.

18. The system of claim 15 in which the polarization beamsplitters have a width transverse to their lengths and the offset between the first and second segments is about one-half the width of the polarization beamsplitters.

19. A polarization conversion system, comprising:

first and second lens arrays that each include multiple lenslets, each lenslet of the first lens array being optically aligned with a lenslet of the second lens array; and a planar array of polarization beamsplitters positioned adjacent the second lens array, each polarization beamsplitter including a pair of elongated right-angle prisms having their respective inclined faces positioned against each other and their lengths extending across plural lenslets of the second lens array, the polarization beamsplitter array including coplanar first and second array segments, the inclined faces of the prisms of the polarization beamsplitters of the first array segment being oriented at substantially a first angle and the inclined faces of the prisms of the polarization beamsplitters of the second array segment being oriented at substantially a second angle that is reversed relative to the first angle, wherein each of the first and second lens arrays includes coplanar first and second lens array segments that each include plural lenslets, the lenslets of the first and second lens array segments being aligned with the polarization beamsplitter arrays in the respective first and second array segments, the lenslets and polarization beamsplitters of the first segments being offset relative to the lenslets and polarization beamsplitters of the bottom segments.

20. The system of claim 19 in which the polarization beamsplitters have a width transverse to their lengths and the offset between the first and second segments is about one-half the width of the polarization beamsplitters.

* * * * *